Feb. 11, 1969  H. P. JEAL  3,426,375
BLIND RIVET WITH SELF-PLUGGING MANDREL
Original Filed Oct. 22, 1965  Sheet 1 of 3
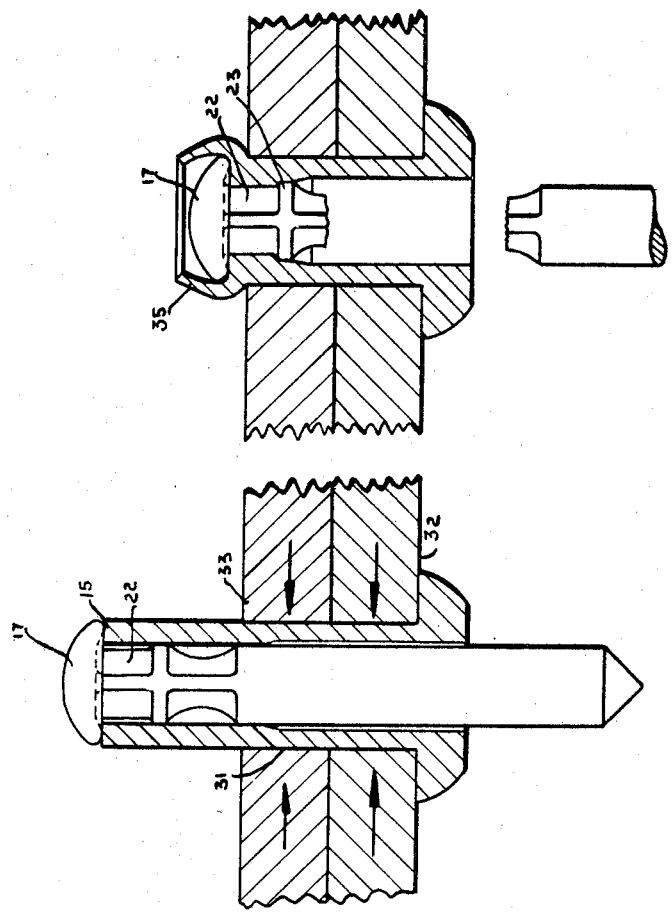
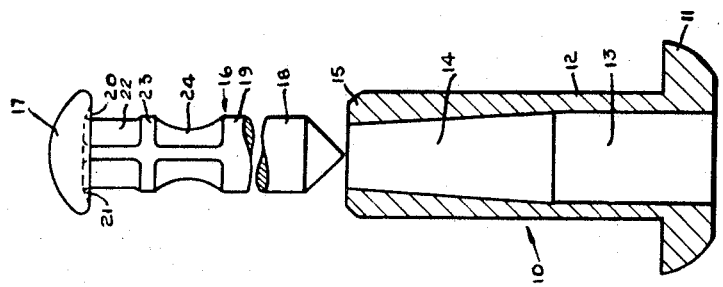
INVENTOR
HARVEY P. JEAL
BY Kenyon, Palmer,
Stewart & Estabrook
ATTORNEYS

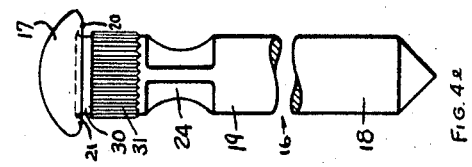
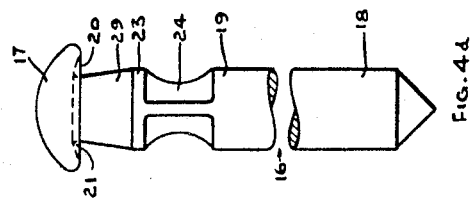
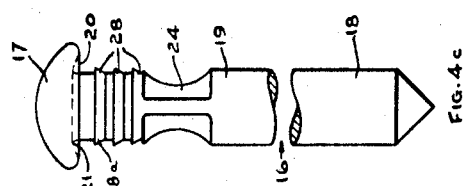
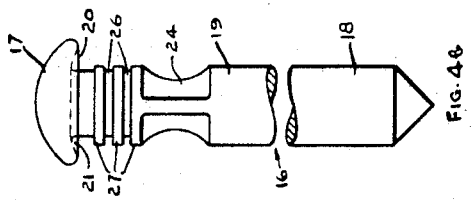
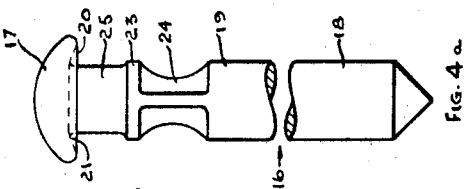
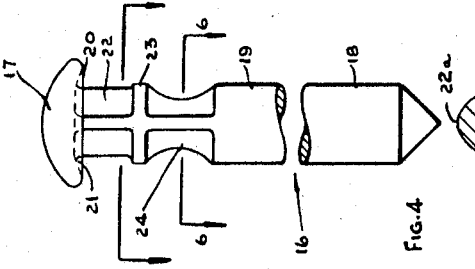
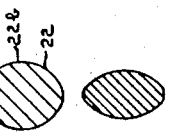

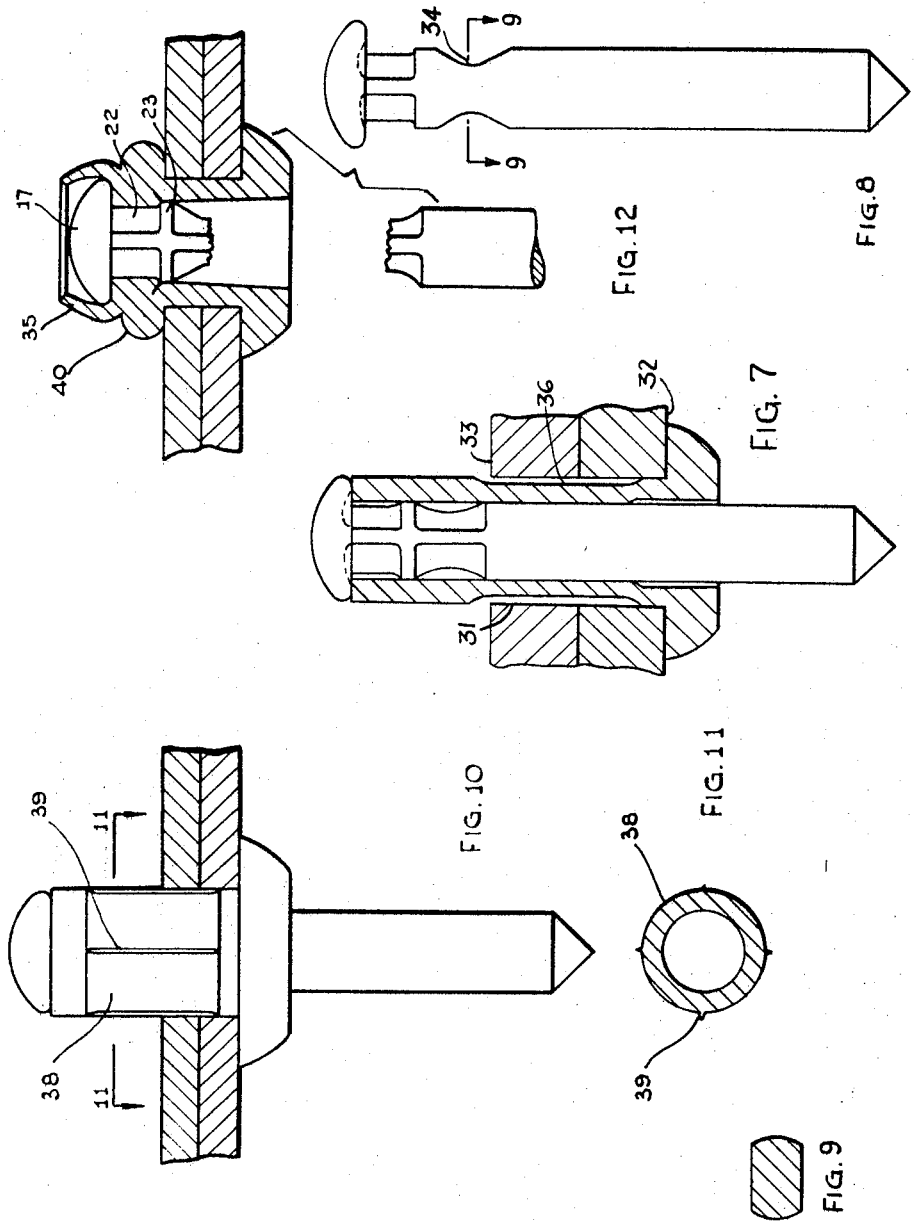

United States Patent Office 3,426,375
Patented Feb. 11, 1969

3,426,375
BLIND RIVET WITH SELF-PLUGGING MANDREL
Harvey Philip Jeal, Stevenage, Hertfordshire, England, assignor to Avdel Limited, Welwyn Garden City, England, a British joint-stock company
Original application Oct. 22, 1965, Ser. No. 507,622, now Patent No. 3,286,580, dated Nov. 22, 1966. Divided and this application Aug. 3, 1966, Ser. No. 581,125
Claims priority, application Great Britain, June 19, 1961, 22,026/61
U.S. Cl. 10—27                                                       1 Claim
Int. Cl. B21j 15/36; F16b 19/10

ABSTRACT OF THE DISCLOSURE

A blind hollow rivet with a self-plugging mandrel is assembled by first forming the rivet to have an interference fit with the mandrel. The mandrel is then inserted into the rivet and following the assembly step the rivet is then crimped over a portion of its length increase the clenching power of the rivet when set in apertured workpieces.

---

The instant application is a division of application Ser. No. 507,622 and now Patent No. 3,286,580.

This invention relates to blind riveting by means of self-plugging mandrels, in which part of the mandrel employed to deform the material of the hollow rivet used is retained within the rivet after completion of the riveting operation.

According to the present invention there is provided a fastener for use in the blind riveting of apertured members, comprising a rivet having an annular head and a tubular shank frictionally telescoped over a self-plugging mandrel having a mushroom-like head and a stem, wherein the stem of the mandrel is of reduced cross-sectional area over a neck region adjacent the head, so that when the head of the mandrel is pulled into the rivet, material from the rivet is forced into the reduced neck so as to lock the retained part of the mandrel in the rivet.

According to another aspect of the invention there is provided a fastener for use in the blind riveting of apertured members, comprising a rivet having an annular head and a tubular shank frictionally telescoped over a self-plugging mandrel having a mushroom-like head and a stem, wherein the stem of the mandrel is formed, adjacent the mandrel head, with a neck of reduced cross-sectional area located between the mandrel head and a shoulder which latter has an external cross-sectional area substantially identical with that of the internal cross-sectional area of the rivet shank, the arrangement being such that when the rivet is upset by pulling the mandrel head into the rivet, metal passes from the rivet into the neck so as to lock the mandrel head in the shank of the rivet.

Preferably the mandrel is also formed with a breaker groove located between the said shoulder and a second shoulder spaced longitudinally from the first shoulder towards the pulling end of the mandrel.

Conveniently the rivet may be externally of reduced cross sectional area over approximately that portion of its length intended to be within the thickness of the members to be riveted.

In a preferred form the neck of the mandrel is of eliptical cross section with the length of the major axis equal to the diameter of the main portion of the stem, the transverse dimensions of the neck region being preferably constant throughout its length axially of the stem. The breaker groove may be of similar eliptical formation with the major axis of the elipse in a plane parallel to the major axis of the elipse of the neck, if not with said two axes parallel with one another.

It is desirable that the minor axis of the breaker region should increase, from a minimum intermediately of the length of said breaker portion in both directions axially of the stem. The neck region may be of plain cylindrical or conical formation, or it may present a number of annular grooves with intervening ring-like portions of which the outer circumferential surfaces may be of cylindrical or tapered, for example, frusto-conical configuration.

In the case of a rivet of the well known internally tapered bore type the diameter of the stem of the mandrel will be greater than the internal diameter of the tail of the rivet. Preferably the rivets and mandrels are offered for sale with the mandrels already forced into the corresponding rivets. Preferably also when this is done the shank of the rivet is crimped radially for a slightly greater length axially than the combined total thickness of the members, such as sheets, to be riveted together whereby the external and internal diameter of the rivet shank is reduced at this region.

This crimping may be such that the rivet diameter is reduced uniformly continuously, or interruptedly at intervals only, around the circumference of the rivet. In the latter case the crimping may be such as to leave a plurality of longitudinal ribs spaced one from another around the circumference of the rivet. Preferably the thickness of the ribs measured circumferentially of the rivet is small, and in a typical case there will be four in number.

The annular face of the head of the mandrel according to the invention which in use is brought to bear upon the end of the tail portion of a rivet may lie in a plane to which the axis of the stem is normal, or, alternatively, said annular face may conform to the curved surface of a frusto cone with its smallest diameter remote from the pull end of the mandrel, the included angle of the frusto cone being, for example, in the order of 160°.

Several embodiments of the invention will now be described with reference to the accompanying drawings by way of example.

In these drawings:

FIG. 1 is a view in section of a tubular rivet and in elevation of a mandrel in accordance with the invention.

FIG. 2 is a view partly in section of a tubular rivet frictionally telescoped over a mandrel and inserted into a hole in sheets to be riveted.

FIG. 3 is a view partly in section of a rivet mandrel assembly after completion of the riveting operation.

FIG. 4 is a view in elevation showing the improved mandrel.

FIGS. 4a, b, c, d, and e are views in elevation showing alternative embodiments of the mandrel in accordance with the invention.

FIG. 5 is a view in cross section of the mandrel taken at line 5—5 of FIG. 4.

FIG. 6 is a view in cross section of the mandrel taken on lines 6—6 of FIG. 4.

FIG. 7 is a view similar to FIG. 2 showing the extent of the crimping of the tubular rivet.

FIG. 8 is a view in elevation of the mandrel similar to the one shown in FIG. 4 but with a modified breaker groove.

FIG. 9 is a view in cross section taken at a line 9—9 of FIG. 8.

FIG. 10 is a view in elevation of the rivet and mandrel assembly according to the invention showing an alternative way of crimping the tubular rivet.

FIG. 11 is a view in cross section taken on lines 11—11 of FIG. 10.

FIG. 12 is a view in cross section showing the riveted joint employing the rivet and mandrel assembly of FIG. 10.

As shown in FIGS. 1-3 a tubular rivet 10 has a head 11 and a shank 12 formed with a parallel bore 13 merging into a taper bore 14 towards the squared-off tail end 15 of the rivet. The rivet 10 is adapted to be frictionally telescoped over a mandrel 16 of a self-plugging type which has an annular mushroom-like head 17 at one end and pulling portion 18 of a stem 19 at the other end. The underside 20 of the head 17 of the mandrel 16 which, when the rivet 10 is fully telescoped over the mandrel 16 is brought to bear upon the tail end 15 of the rivet 10, has a curved surface 21 of a frusto-cone, the included angle of the frusto-cone being preferably of the order of 160°. Alternatively, the annular face of the underside of the head 17 may lie in a plane to which the axis of the stem 19 is at an angle of 90°.

Adjacent its head 17 the mandrel 16 is formed with a neck 22 of reduced transverse dimension, the cross section of which is of eliptical shape. The major axis 22a of the elipse corresponds to the full diameter of the main portion of the mandrel stem 19 whilst the minor axis 22b is substantially reduced. The neck 22 extends for a short distance from the head 17 towards the pulling portion 18 of the mandrel 16, and merges into a shoulder 23 which has a diameter equal to the full diameter of the stem 19. Beyond the annular shoulder 23 the stem of the mandrel 16 is further reduced in its cross section, which again is of eliptical shape, but the minor axis of the elipse being substantially smaller than the minor axis of the neck 22b to provide a breaker groove 24 which constitutes the weakest portion of the mandrel 16 and breaks when a pre-determined load on the mandrel is reached.

Alternative embodiments of the mandrel according to the invention are illustrated in FIGS. 4a-4e in which the breaker grooves are of the same shape as that in the mandrel shown in FIGS. 4 and 6.

The mandrel shown in FIG. 4a differs from the one described in that the neck 25 of the mandrel 16 is of cylindrical shape the diameter of which is smaller than the diameter of the shoulder 23. The mandrel illustrated in FIG. 4b is formed with a plurality of annular grooves 26 with intervening ring-like portions 27. The diameter of the shoulder 27 is equal to the diameter of the main portion 19 of the stem 19. The mandrel shown in FIG. 4c is similar to the one described in FIG. 4b except that the spaced ring-like portions 28 have tapered circumferential surfaces 28a thus forming sharp edges. The neck 29 of the mandrel 16 shown in FIG. 4d is of conical formation diverging from the underside 20 of the head 17 towards the shoulder 23 into which the tapering portion 29 merges.

The mandrel shown in FIG. 4e has, immediately under the head 17, a short smooth portion 30 the diameter of which is equal to that of the stem 19 and is followed by longitudinal splines 31 formed by squeezing the material outwards to produce indentations.

The bore 14 of the tubular rivet 10 at the tail end is slightly smaller than the external diameter of the mandrel 16. In view of the above it is necessary, the mandrel stem being an interference fit (a forced fit) in the taper bore 14 of the tubular rivet, to force the mandrel stem 19 into the rivet 10. The underside 20 of the mandrel head 17 bears against the tail end 15 of the rivet when the latter is fully telescoped over the mandrel 16 and the rivet mandrel assembly is then inserted into the aligned rivet holes 31 in sheets 32 and 33.

By forcing the mandrel 16 through the taper bore 14 particularly near the tail end 15 of the rivet 10 the taper is substantially removed as shown in FIG. 2. The rivet material at this region is displaced axially so that the taper bore of the rivet approaches a parallel bore.

When a pull on the mandrel 16 is exerted and at the same time a reaction force is applied against the rivet head 11, with the front jaws or an abutment forming part of the riveting tool (not shown), the mandrel head 17 is drawn into the rivet bore near the tail end upsetting the tail end 15 of the rivet into a secondary head 35 at the inaccessible side of the work.

After the sheets 32 and 33 are fully closed or drawn tightly one against the other, the rivet shank 12 is subjected to a high compressive stress which causes the surplus material at or near the tail 15 of the rivet shank 12 to flow into the neck 22 of the mandrel 16. At the same time the remainder of the shank 12 is thickened so that the riveting hole 31 in sheets 32 and 33 is completely filled. In other words, there is no gap between the external surface of the rivet shank 12 and the inner wall of the hole 31 in sheets 32 and 33, as clearly shown in FIGURE 3. When the predetermined tension load in the mandrel is reached the breaker groove 24 yields and the mandrel breaks off. The broken portion of the mandrel falls away whilst the head 17, the neck 22 and the shoulder 23 of the mandrel 18 are positively held axially and locked in the rivet 10.

Several tests were carried out on the 1/8" diameter tubular rivet with a view to ascertaining the retention value of the mandrel head 17 and the parts 22, 23 of the mandrel 16 in the upset rivet and it was established that the push-out load, in order to remove the mandrel from the rivet 10, was of the order of 50 lbs. This is greatly in excess of the force required in the case of conventional self-plugging mandrels.

It has been found that the high clenching of the sheets could be still further improved by crimping the rivets 10 radially against the stem of the mandrel to reduce the wall thickness of the rivet over a region of the rivet adjacent the rivet head, see FIG. 7, after the mandrel 16 had been forced into the rivets as previously described. Extensive tests were carried out with various types of rivets in order to determine the length of the crimping region appropriate to the given thickness of sheets or other members to be riveted together. In FIG. 7 the crimping region, i.e. that region intended eventually to be within the thickness of the plates, is designated 36, and the dimensions of the crimping regions in the case of a rivet having 5/32" diameter are as follows:

| Crimping region: | Sheet thickness of material to be riveted |
|---|---|
| .103" | Up to 1/16". |
| .165" | 1/16" to 1/8". |
| .228" | 1/8" to 3/16". |
| .290" | 3/16" to 1/4". |

The above crimping is such as to reduce the cross-sectional area of the rivet uniformly around the circumference of the rivet. In the case of FIGS. 10, 11 and 12, however, the crimping is performed at four equal segments 38 around the circumference leaving four intervening longitudinal ribs 39.

It will be noted that when the rivet is crimped as shown in FIGS. 10 and 11 the tail of the rivet shank 12 will collapse in concertina fashion during the upsetting operation to form a second head portion 40 between the head portion 35 and the sheets 32 and 33, which is depicted from FIG. 12.

The crimping of the rivet mandrel assembly as illustrated in FIGS. 10 and 11 improves still further the function in that the ribs 39 on the rivet shank 12 contribute to the better retention of the rivet 10 in holes 31 of sheets 32, 33 to be riveted when the rivet 10 is placed in these sheets for setting. Furthermore, with the rivet mandrel assembly of FIG. 10 a wider range of sheet thicknesses can be effectively riveted with the same size rivet.

It will be understood that the breaker groove of the mandrel may have opposed flats intermediate its length, such as shown in FIGS. 8 and 9 of the drawing.

Tests were carried out with a view to establishing fluid tightness of the rivet joint, all the tests employing the same size rivet namely 1/8" diameter and the improved mandrel in accordance with the invention.

In three cases the sheet thickness was the maximum and in three other cases the sheet thickness was the minimum for the particular rivet. All these specimens have been subjected to water leakage tests under a fluctuating pressure of 0—20 p.s.i. whilst being subjected to temperature variation. So far, the temperature has been cycled four times from room temperature to 100° C. and twice from —150° to 100° C. During this cycling, the test pressure has been applied at a frequency of approximately 25 cycles per minute and in all, 70,000 cycles have been done without any trace of leaking under any of the conditions for any of the specimens.

I claim:

1. The method of forming a fastener of the type described which comprises the following steps in the order named, forming the rivets so that the shank thereof, over at least a portion of its length, has an internal diameter to provide an interference fit with the stem of the mandrel, and an outside diameter throughout the length of the shank to permit passage of the shank of the rivet through apertures in the members to be fastened, forcing the stem of the mandrel through the rivet until the head of the mandel engages the end of the tubular shank of the rivet, crimping the shank of the rivet radially about its circumference to reduce the wall thickness of the shank of the rivet over a region extending from a point adjacent the head of the rivet to a point short of the end of the shank and to increase the clenching power of the rivet when set, thereby leaving an uncrimped portion of the rivet shank adjacent the head of the mandrel.

References Cited

UNITED STATES PATENTS

| | | | |
|---|---|---|---|
| 2,030,166 | 2/1936 | Huck | 85—70 X |
| 2,030,167 | 2/1936 | Miller | 85—70 |
| 2,536,353 | 1/1951 | Cooper | 85—77 |

LEONIDAS VLACHOS, *Primary Examiner.*

U.S. Cl. X.R.

85—70